(12) United States Patent
Offerman

(10) Patent No.: US 9,215,926 B1
(45) Date of Patent: *Dec. 22, 2015

(54) STORAGE RACK WITH IMPROVED TIE SUPPORT

(71) Applicant: LF Centennial Limited, Tortola (VG)

(72) Inventor: Ryan Thomas Offerman, Cardiff, CA (US)

(73) Assignee: LF CENTENNIAL LIMITED, Road Town, Offshore Incorporations Center, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 14/585,526

(22) Filed: Dec. 30, 2014

Related U.S. Application Data

(63) Continuation-in-part of application No. 14/304,895, filed on Jun. 14, 2014.

(51) Int. Cl.
| | | |
|---|---|---|
| A47B 55/00 | (2006.01) | |
| A47B 47/00 | (2006.01) | |
| A47B 47/03 | (2006.01) | |

(52) U.S. Cl.
CPC .............. *A47B 55/00* (2013.01); *A47B 47/0083* (2013.01); *A47B 47/03* (2013.01)

(58) Field of Classification Search
CPC .............. A47B 47/0058; A47B 47/021; A47B 47/028; A47B 57/06; A47B 57/08; A47B 57/30; A47B 57/32; A47B 57/34; A47B 57/40; A47B 57/402; A47B 57/48; A47B 57/482; A47B 57/485; A47B 57/487; A47B 96/02; A47B 96/021; A47B 96/024; A47B 96/028; A47B 96/067; A47B 96/1441

USPC .......................... 211/190, 191, 192, 204, 206; 248/220.21, 220.22, 220.31, 223.41, 248/224.8, 225.11

See application file for complete search history.

(56) References Cited

U.S. PATENT DOCUMENTS

| | | | | |
|---|---|---|---|---|
| 3,086,660 | A | * | 4/1963 | Steele ............................ 108/161 |
| 3,862,691 | A | * | 1/1975 | Mori et al. ..................... 211/191 |
| 4,048,059 | A | * | 9/1977 | Evans ............................ 108/155 |
| 4,216,729 | A | * | 8/1980 | Schrader ........................ 108/159 |
| 6,520,357 | B1 | * | 2/2003 | Kautz et al. ................... 211/191 |
| 8,443,992 | B2 | | 5/2013 | Lawson et al. |

(Continued)

FOREIGN PATENT DOCUMENTS

| | | | | |
|---|---|---|---|---|
| DE | 3732738 | A1 * | 12/1988 | .............. A47C 19/20 |
| EP | 1129644 | A1 * | 9/2001 | .............. A47B 57/50 |

(Continued)

*Primary Examiner* — Joshua Rodden

(74) *Attorney, Agent, or Firm* — Barlow, Josephs & Holmes, Ltd.

(57) ABSTRACT

A storage rack includes front and rear deck beams and C-shaped tie supports extending between the deck beams. Each tie support has a side wall, a top flange and a bottom flange. The top flange and bottom flange have front and rear ends and tabs extending downwardly therefrom. The top flange has a reinforcing rib. When assembled with the deck beams the front and rear ends of the top flange are seated on a support ledge of the deck beams with the tabs received into respective slots. Similarly, the front and rear ends of the bottom flange are seated on a lower leg of the front and rear deck beams with the tabs received into respective slots. The tie supports cooperate with the deck beams to limit the sagging of the decks, while also preventing outward twisting of the deck beams.

8 Claims, 8 Drawing Sheets

(56) References Cited

U.S. PATENT DOCUMENTS

| | | | |
|---|---|---|---|
| 8,695,816 B2* | 4/2014 | Troyner et al. | 211/191 |
| 2001/0045404 A1* | 11/2001 | Pellegrino | 211/192 |
| 2008/0251483 A1* | 10/2008 | Davis et al. | 211/187 |
| 2011/0042336 A1* | 2/2011 | Cheng et al. | 211/153 |
| 2012/0067838 A1* | 3/2012 | Lawson et al. | 211/134 |
| 2014/0116973 A1* | 5/2014 | Buckley et al. | 211/134 |
| 2015/0076098 A1* | 3/2015 | Caldwell | 211/183 |

FOREIGN PATENT DOCUMENTS

| | | | |
|---|---|---|---|
| EP | 2664256 A1 * | 5/2012 | A47B 96/021 |
| FR | 2889654 A1 * | 2/2007 | A47B 47/02 |
| FR | 2972613 A1 * | 9/2012 | |

* cited by examiner

STORAGE RACK WITH IMPROVED TIE SUPPORT

CROSS REFERENCE TO RELATED APPLICATION

This application is a continuation-in-part of earlier filed U.S. utility patent application Ser. No. 14/304,895, filed Jun. 14, 2014, and the entire contents thereof is incorporated herein by reference.

BACKGROUND OF THE INVENTION

Field of the Invention

The instant invention relates to ready-to-assemble rack storage systems. More specifically, the invention relates to an improved deck beam and C-shaped tie support arrangement which, under significant weight, prevents or limits the bowing or sagging of the deck beam, while also preventing outward twisting of the bottom flange of the deck beam.

SUMMARY OF THE INVENTION

In an exemplary embodiment, a storage rack includes four vertical corner supports and a plurality of horizontal shelf assemblies each supported on the vertical corner supports.

Each shelf assembly comprises front and rear horizontal deck beams which extend side to side between and are supported by the vertical supports, a plurality of C-shaped tie supports extending front to back between the front and rear horizontal deck beams and a planar shelf supported on the interlocked tie supports and deck beams.

Each of the deck beams has an outer vertical side wall, a horizontal lower leg extending inwardly, a horizontal upper leg extending inwardly, and a horizontal support ledge extending further inwardly from the upper leg at a height which is below the upper leg. The support ledge and the lower leg both include a plurality of aligned mounting slots extending parallel to a longitudinal extent of the deck beams.

Each tie support has a vertically extending side wall, a horizontal top flange extending inwardly and a horizontal bottom flange extending inwardly parallel to the top flange. The top flange has front and rear ends and tabs extending downwardly from the front and rear ends. The bottom flange has front and rear ends and tabs extending downwardly from the front and rear ends. When assembled with the deck beams the front and rear ends of the top flange are seated on the support ledge of the front and rear deck beams with the tabs received into the respective slots. Similarly, the front and rear ends of the bottom flange are seated on the lower leg of the front and rear deck beams with the tabs received into the respective slots.

In use, the top and bottom flanges of the tie support cooperate to limit the sagging of the deck beams, while the interlocking tabs and slots of the tie supports and deck beams also cooperate to prevent outward twisting of the deck beams.

The planar shelf is received and supported on the lower support ledge of the deck beams, and on top of the tie supports wherein the top surface of the shelf is flush with the upper surface of the horizontal upper leg of the deck beams to form a continuous planar shelf surface.

A second embodiment of the tie support has a reinforcing rib that extends long the top flange, which increases the rigidity of the top flange and the tie support. The reinforcing rib increases the resistance to sagging of the deck beams that the tie support provides.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE INVENTION

Figure 1:
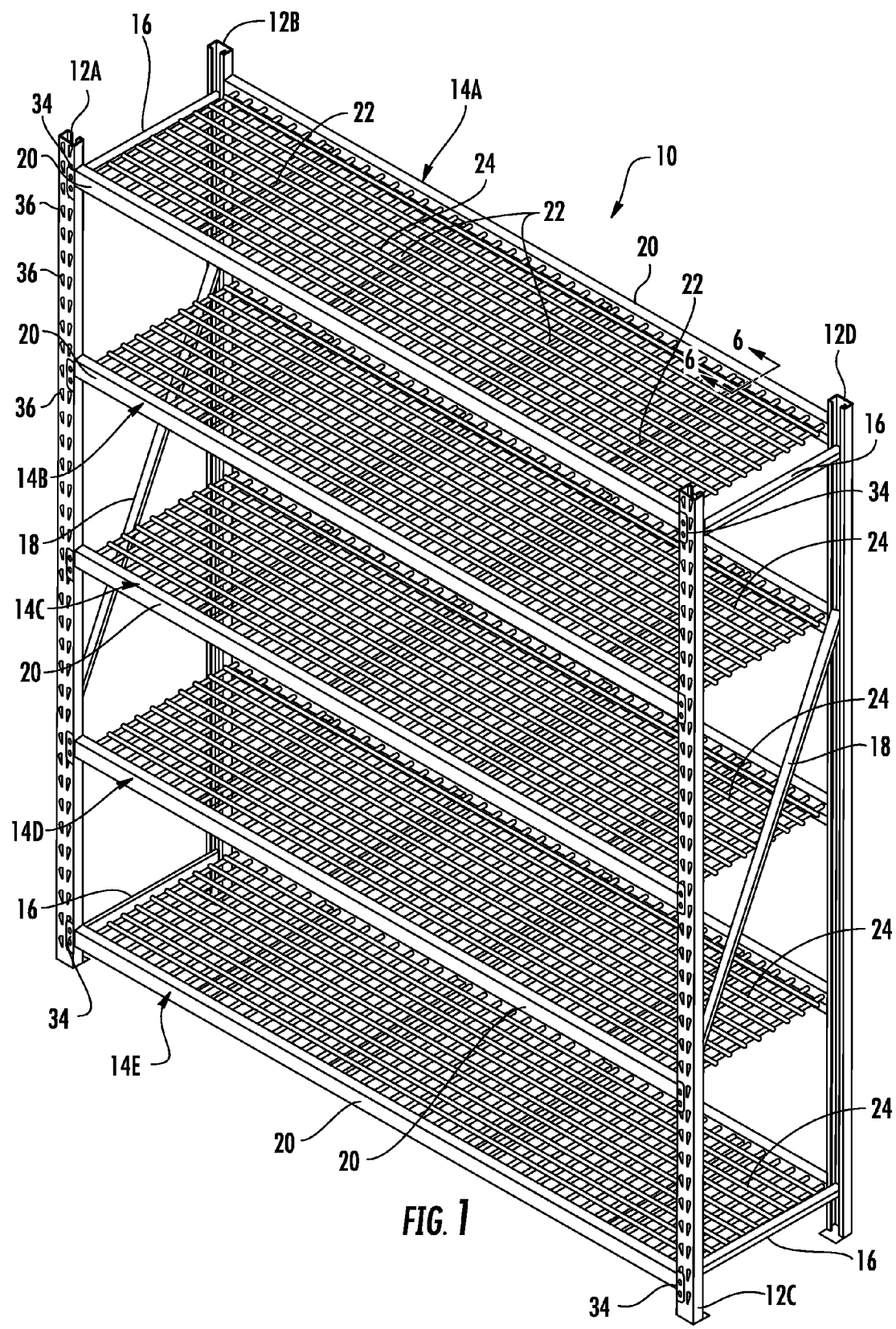
FIG. 1 is a perspective view of an exemplary embodiment storage rack.

Referring now to the drawings, an exemplary embodiment of the inventive storage rack is generally indicated at 10 in FIGS. 1-10.

In the exemplary embodiment, the storage rack 10 includes four vertical corner supports 12A-D and a plurality of horizontal shelf assemblies 14A-E each supported on the vertical corner supports 12A-D. It should be noted that while the storage rack 10 is illustrated with five (5) shelf assemblies, the rack could also include fewer shelf assemblies or more shelf assemblies as the user desires.

The vertical supports 12A-D in the exemplary embodiment are provided in end pairs (12A-B) (12C-D) with the respective paired front and rear supports connected by smaller upper and lower horizontal braces 16 and an angle brace 18.

As seen in FIGS. 1-7, each shelf assembly 14 includes front and rear horizontal deck beams 20 which extend side to side between and are supported by the vertical supports 12A-D, a plurality of tie supports 22 extending front to back between the front and rear horizontal deck beams 20 and a planar shelf 24 supported on the interlocked tie supports 22 and deck beams 20.

Each of the deck beams 20 is generally C-shaped in cross-section, having an outer vertical side wall 26, a horizontal lower leg 28 extending inwardly, a horizontal upper leg 30 extending inwardly, and a horizontal support ledge 32 extending further inwardly from the upper leg 30 at a height which is below the upper leg 30. (See FIGS. 2 and 6). The opposing ends of each deck beam 20 include angle channels 34 with hook tabs (not shown) that are received into corresponding slots 36 formed along the length of the vertical supports 12.

Referring again to FIGS. 2 and 6, the support ledge 32 and the lower leg 28 of each deck beam 20 respectively include a plurality of vertically aligned mounting slots 38 extending parallel to a longitudinal extent of the deck beams 20.

Figure 3:
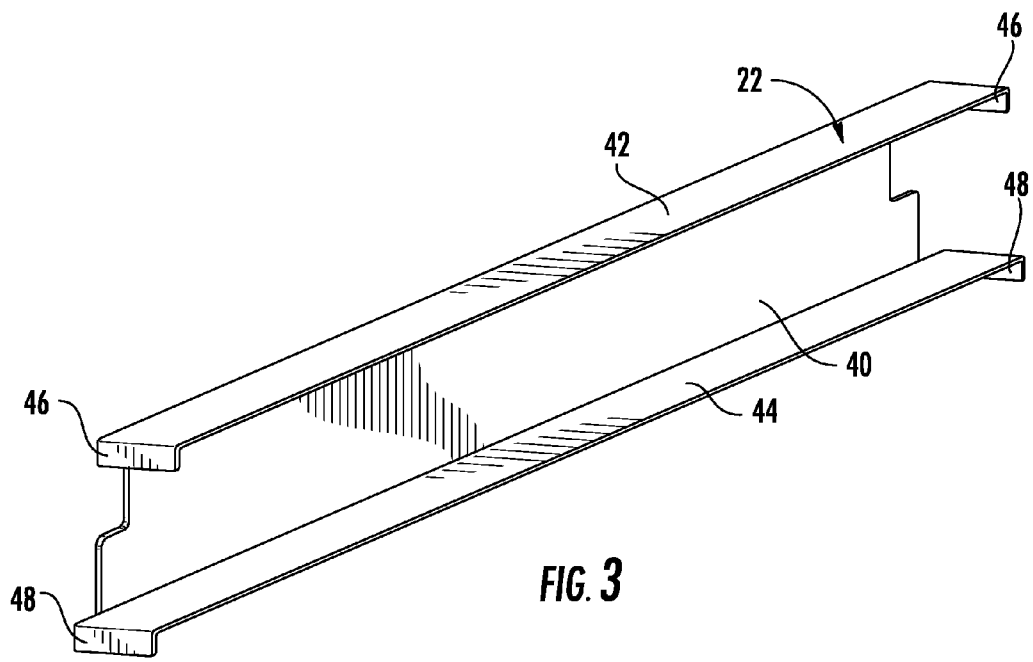
FIG. 3 is a perspective view of an exemplary tie support.
Figure 4:
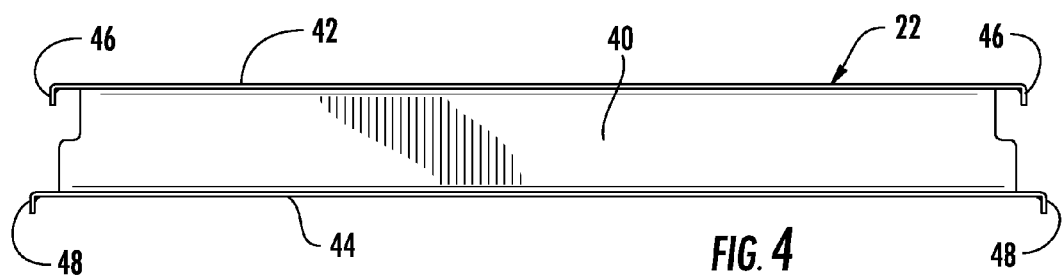
FIG. 4 is a front view thereof.
Figure 5:
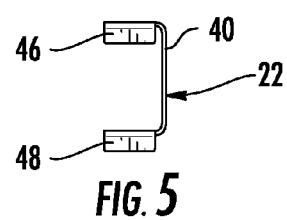
FIG. 5 is an end view thereof.
Figure 6:
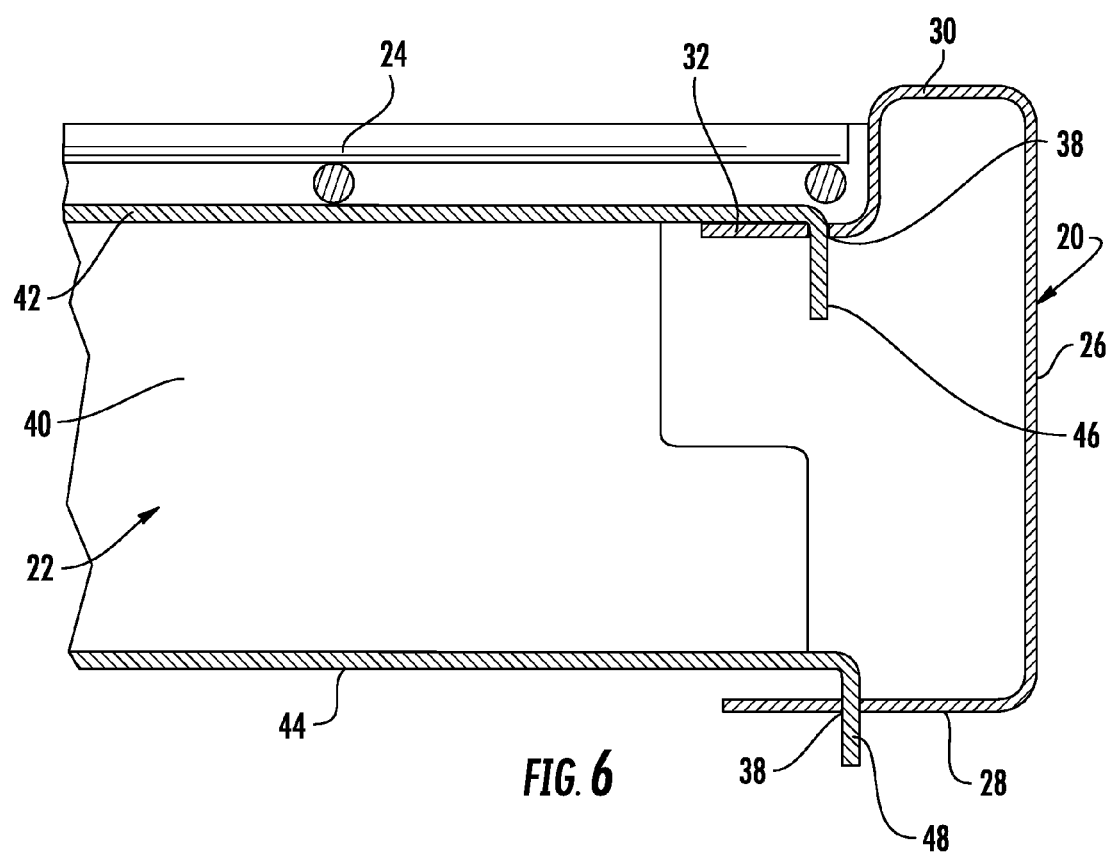
FIG. 6 is a cross-sectional view of the deck beam/tie support interconnection taken along line 6-6 of FIG. 1.

Referring to FIGS. 3-7, the present invention provides a first embodiment of a tie support, in which each tie support 22 is also generally C-shaped in cross-section, having a vertically extending side wall 40, a horizontal top flange 42 extending inwardly and a horizontal bottom flange 44 extending inwardly parallel to the top flange 42. The top flange 42 has front and rear ends and tabs 46 extending downwardly from the front and rear ends. Similarly, the bottom flange 44 also has front and rear ends and tabs 48 extending downwardly from the front and rear ends. Referring to FIGS. 3, 4 and 6 it can be clearly seen that the bottom flange 44 is slightly longer than the top flange 42 whereby the downwardly extending tabs 46 and 48 are horizontally offset from each other.

Figure 2:
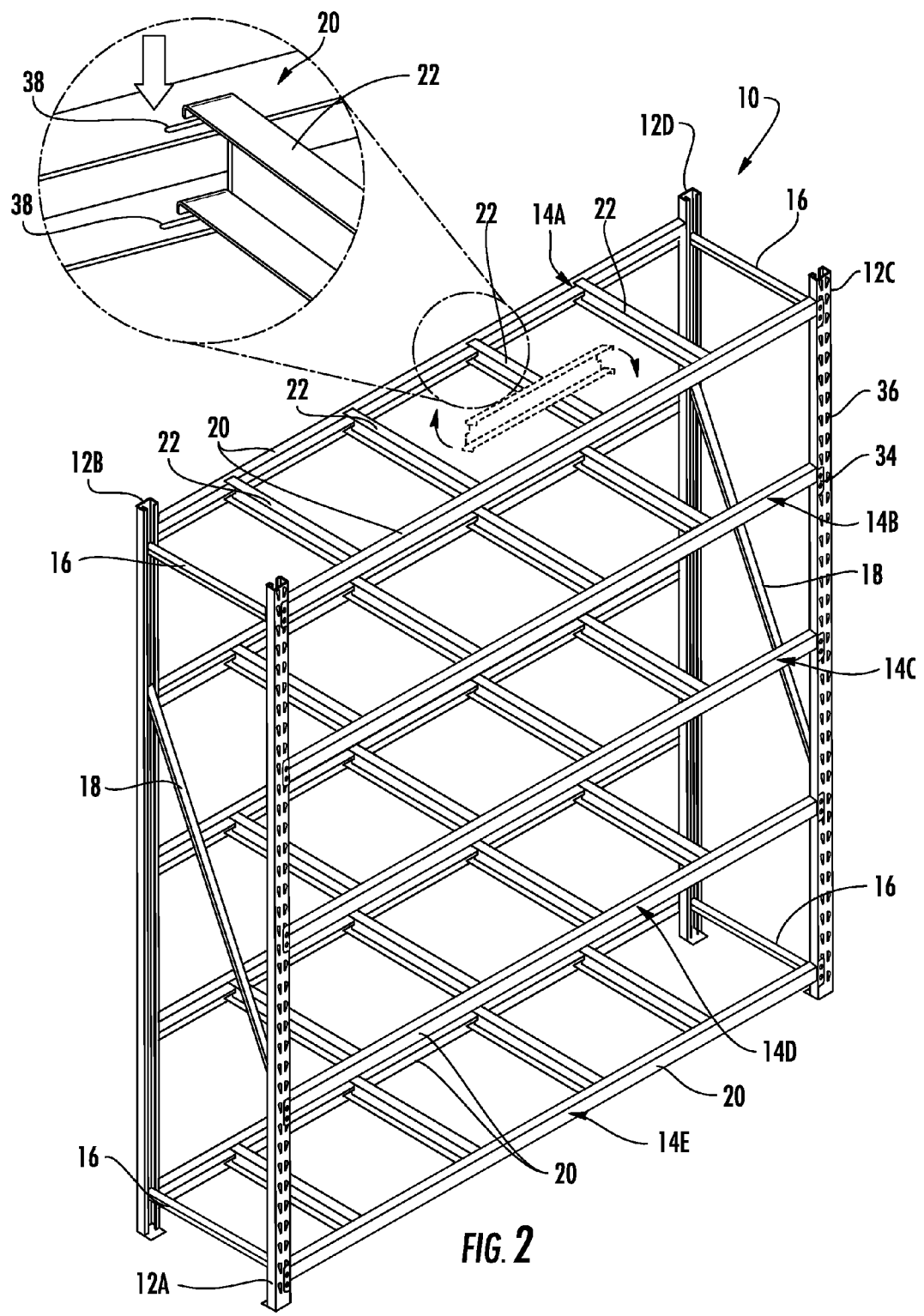
FIG. 2 is another perspective view thereof, showing assembly of the tie supports with the deck beams.

When assembled with the deck beams 20 the front and rear ends of the top flange 42 are seated on the support ledge 32 of the front and rear deck beams 20 with the tabs 46 received into the respective slots 38. Similarly, the front and rear ends of the bottom flange 44 are seated on the lower leg 28 of the front and rear deck beams 20 with the tabs 48 received into the respective slots 38. (see FIGS. 2, 6 and 7). As illustrated in FIGS. 1 and 2 each shelf assembly 14 includes a plurality of the tie supports 22 extending front to back between the deck beams 20.

When assembled, C-shaped cross-section of the tie support 22, cooperate to limit the sagging of the deck beams 20, while the interlocking tabs 46,48 and slots 38 of the tie supports 22 and deck beams 20 cooperate to prevent outward twisting of the lower leg 28 of the deck beams 20.

Figure 7:
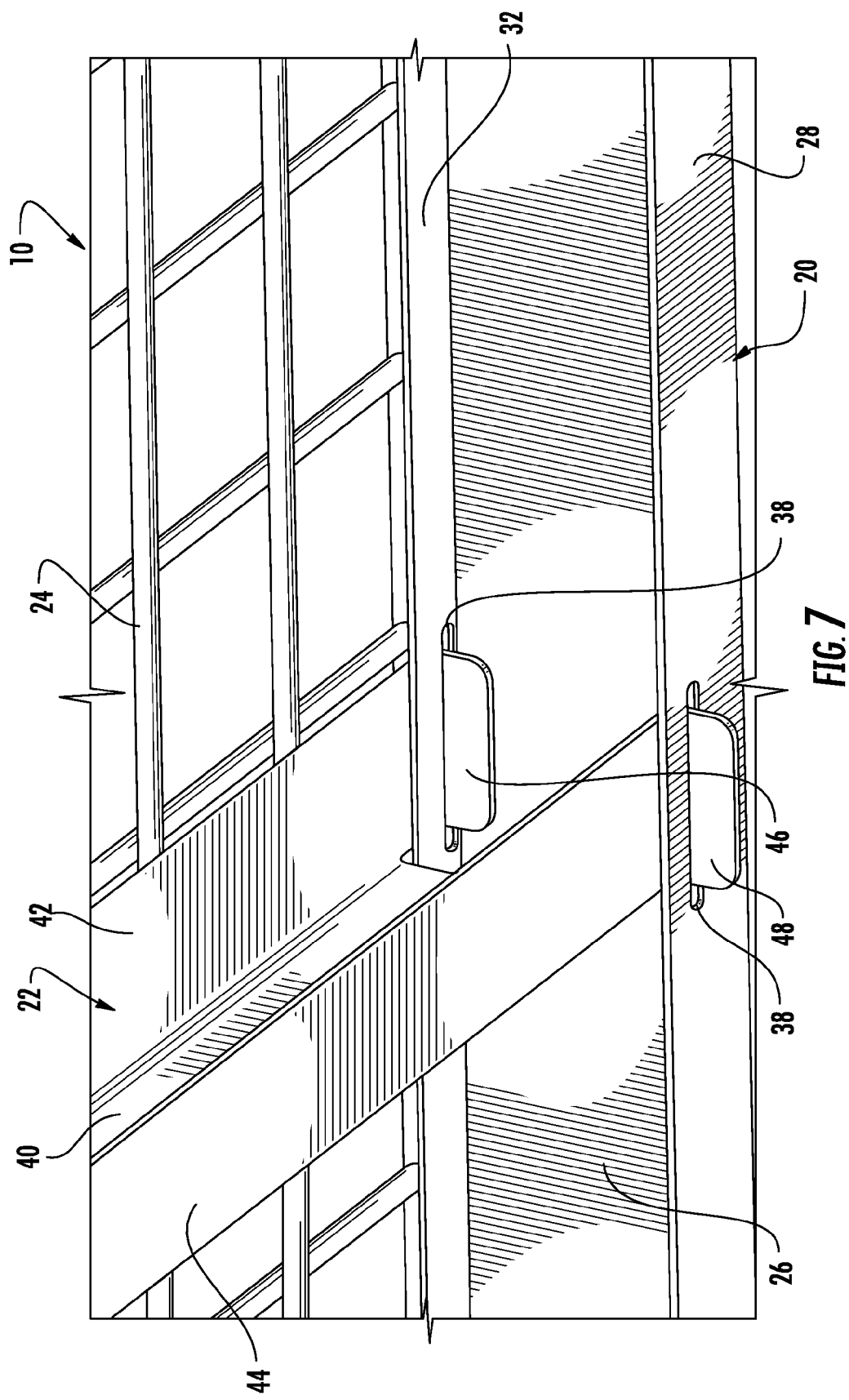
FIG. 7 is an enlarged perspective view from beneath showing the deck beam/tie support interconnection.

As best illustrated in FIGS. 1, 6, and 7, the planar shelf 24 is received and supported on the support ledges 32 of the deck beams 20, and on top of the tie supports 22 wherein the top surface of the shelf 24 is flush with the upper surface of the horizontal upper leg 30 of the deck beams 20 to form a continuous planar shelf surface. In the exemplary embodiment, the shelf 24 comprises a mesh configuration. However, any form of planar shelving material 24 would be suitable in the context of the invention.

Additionally, it should be noted that while all of components in the exemplary embodiment are preferably fabricated from a rigid metal material to provide the highest rigidity and durability, any individual component or all of the components could be fabricated from other materials with similar effect.

Figure 8:
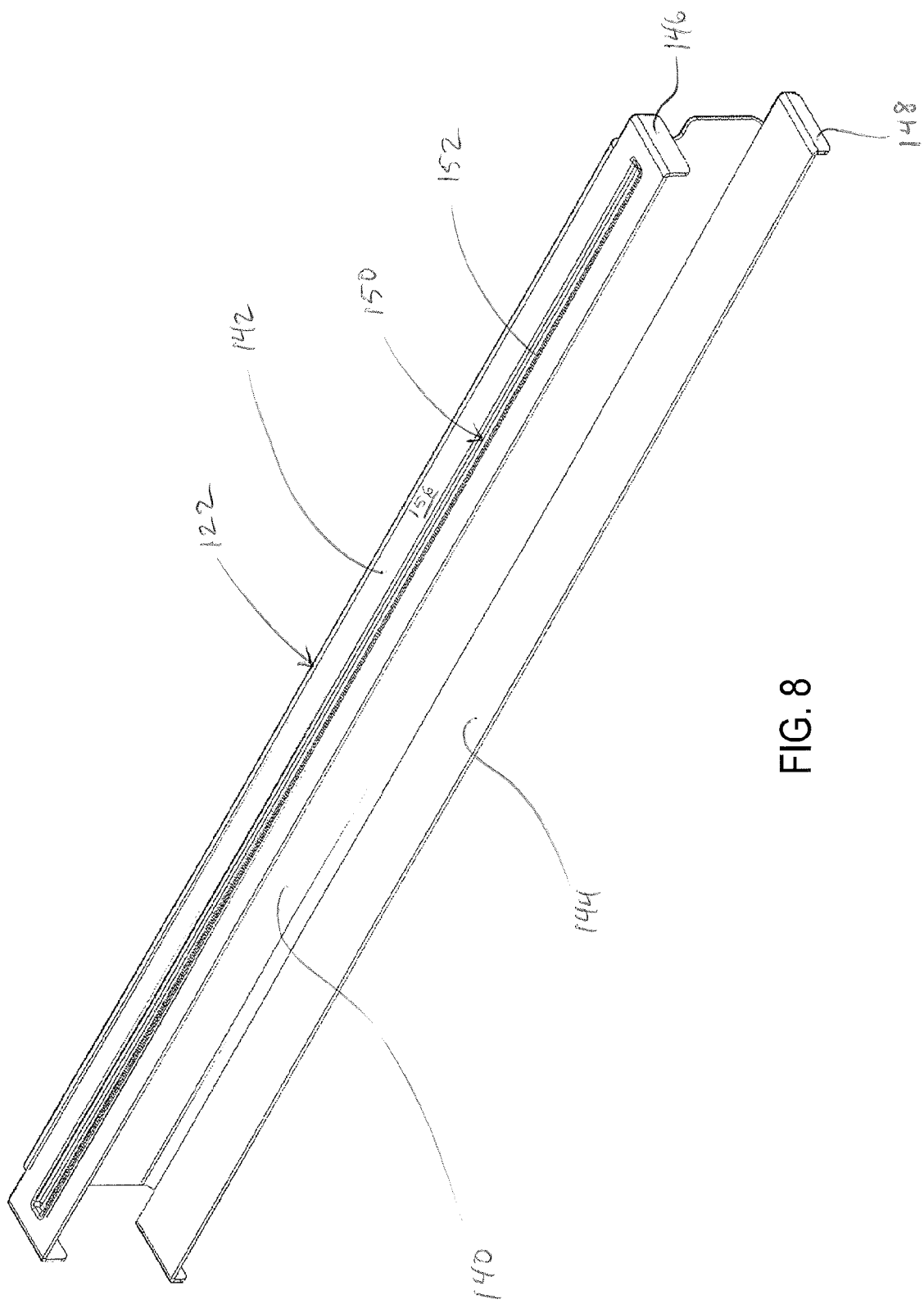
FIG. 8 is a perspective view of a second embodiment of the tie support.
Figure 9:
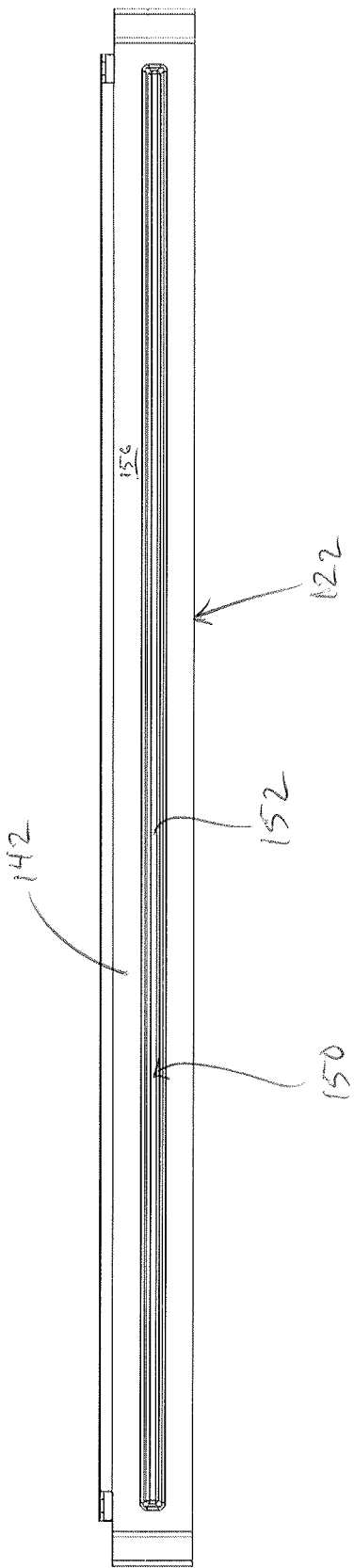
FIG. 9 is a top view thereof.
Figure 10:
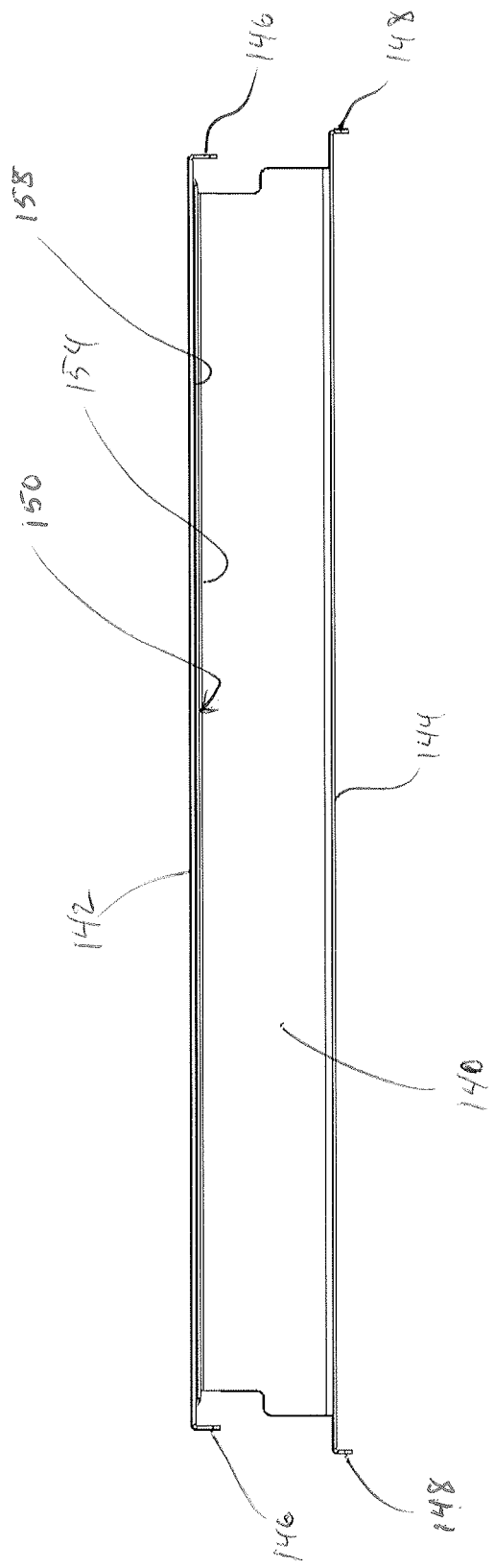
FIG. 10 is a front view thereof.

Referring to FIGS. 8-10, the present invention provides a second embodiment of a tie support, in which each tie support 122 is also generally C-shaped in cross-section, having a vertically extending side wall 140, a horizontal top flange 142 extending inwardly and a horizontal bottom flange 144 extending inwardly parallel to the top flange 142. The top flange 142 has front and rear ends and tabs 146 extending downwardly from the front and rear ends. Similarly, the bottom flange 144 also has front and rear ends and tabs 148 extending downwardly from the front and rear ends. Referring to FIGS. 8, 9 and 10 it can be clearly seen that the bottom flange 144 is slightly longer than the top flange 142 whereby the downwardly extending tabs 146 and 148 are horizontally offset from each other.

The second embodiment of the tie support 122 has a reinforcing rib 150 defined in the top flange 142. The reinforcing rib 150 extends longitudinally along the top flange 142, from a point near the front end of the top flange 142 to a point near the rear end of the top flange 142. The reinforcing rib 150 has a concave upper surface 152 connected to the upper surface 156 of the top flange 142, as shown in FIGS. 8-9. The upper surface 156 is substantially planar, and extends around the periphery of the concave surface 152 of the reinforcing rib. The reinforcing rib 150 has a convex lower surface 154 connected to a lower surface 158 of the top flange 142, as shown in FIG. 10.

FIG. 9 shows that the reinforcing rib 150 is substantially centered laterally on the top flange 142. FIG. 10 shows that the reinforcing rib 150 depends downwardly from the top flange 142, so that the top flange has a substantially planar upper surface. A planar shelf 24 can be supported on the top flange 142 of the tie support 122.

The reinforcing rib 150 increases the resistance to sagging of the deck beams 20 that the tie support 122 provides. The reinforcing rib 150 increases the rigidity of the top flange 142, thereby increasing the rigidity of the tie support 122.

A plurality of tie supports 122 according to the second embodiment of the tie support can be used in place of the plurality of tie supports 22 of FIGS. 1-7 in each shelf assembly 14 of the storage rack 10. The second embodiment of the tie support 122 engages the front and rear horizontal deck beams 20 in the same way that the first embodiment of the tie support 22 does.

It can therefore be seen that the exemplary embodiments provide a unique and novel storage rack 10, which is easy to assemble and which provides a high degree of strength. The unique tie supports 22, 122 provide an improved level of rigidity to the rack structure and prevent unwanted sagging and twisting of the deck beams under heavy loading.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A storage rack comprising:
left and right rear vertical supports;
left and right front vertical supports;
front and rear horizontal deck beams respectively extending between and supported by each of the left and right, front and rear vertical supports,
each of said deck beams having an outer vertical side wall, a horizontal lower leg extending inwardly, a horizontal upper leg extending inwardly, and a horizontal support ledge extending further inwardly from said upper leg at a height which is below the upper leg,
said support ledge and said lower leg including a plurality of aligned slots extending parallel to a longitudinal extent of said deck beams;
a C-shaped tie support having a vertically extending side wall, a horizontal top flange extending inwardly and a horizontal bottom flange extending inwardly parallel to the top flange,
said top flange having front and rear ends and tabs extending downwardly from said front and rear ends,
said front and rear ends of said top flange being seated on said support ledge of said front and rear deck beams with said tabs received into said slots,
said bottom flange having front and rear ends and tabs extending downwardly from said front and rear ends,
said front and rear ends of said bottom flange being seated on said lower leg of said front and rear deck beams with said tabs received into said slots,
a reinforcing rib defined in said top flange;
wherein the top and bottom flanges of said tie support cooperate to prevent sagging of the deck beams, and
wherein the interlocking tabs and slots of the tie supports and the deck beams cooperate to limit outward twisting of the deck beams; and
a planar shelf received and supported on said support ledge, wherein said shelf is flush with an upper surface of said horizontal upper leg of said deck beam to form a continuous planar shelf surface.

2. The storage rack of claim 1 wherein said bottom flange of said tie support has a length which is greater than said top flange, such that the tabs on said bottom flange are offset from the tabs on the top flange.

3. The storage rack of claim 1 wherein said reinforcing rib extends substantially longitudinally along said top flange.

4. The storage rack of claim 1 wherein said reinforcing rib has a concave upper surface connected to an upper surface of said top flange, and said reinforcing rib has a convex lower surface connected to a lower surface of said top flange.

5. A shelf for a storage rack comprising:

front and rear horizontal deck beams, each of said deck beams having an outer vertical side wall, a horizontal lower leg extending inwardly, a horizontal upper leg extending inwardly, and a horizontal support ledge extending further inwardly from said upper leg at a height which is below the upper leg, said support ledge and said lower leg including a plurality of aligned slots extending parallel to a longitudinal extent of said deck beams;

a C-shaped tie support having a vertically extending side wall, a horizontal top flange extending inwardly and a horizontal bottom flange extending inwardly parallel to the top flange, said top flange having front and rear ends and tabs extending downwardly from said front and rear ends, said front and rear ends of said top flange being seated on said support ledge of said front and rear deck beams with said tabs received into said slots, said bottom flange having front and rear ends and tabs extending downwardly from said front and rear ends, said front and rear ends of said bottom flange being seated on said lower leg of said front and rear deck beams with said tabs received into said slots, a reinforcing rib defined in said top flange;

wherein the top and bottom flanges of said tie support cooperate to prevent sagging of the deck beams, and wherein the interlocking tabs and slots of the tie supports and the deck beams cooperate to limit outward twisting of the deck beams; and a planar shelf received and supported on said support ledge, wherein said shelf is flush with an upper surface of said horizontal upper leg of said deck beam to form a continuous planar shelf surface.

6. The storage rack of claim 5 wherein said bottom flange of said tie support has a length which is greater than said top flange, such that the tabs on said bottom flange are offset from the tabs on the top flange.

7. The storage rack of claim 5 wherein said reinforcing rib extends substantially longitudinally along said top flange.

8. The storage rack of claim 5 wherein said reinforcing rib has a concave upper surface connected to an upper surface of said top flange, and said reinforcing rib has a convex lower surface connected to a lower surface of said top flange.

\* \* \* \* \*